(12) United States Patent
Repensek (10) Patent No.: US 10,223,667 B2
(45) Date of Patent: Mar. 5, 2019

(54) METHOD FOR MONITORING AND TRACKING IDENTIFIED MATERIAL IN FILLABLE RECEPTACLES

(71) Applicant: Joshua Repensek, Miami, FL (US)

(72) Inventor: Joshua Repensek, Miami, FL (US)

( * ) Notice: Subject to any disclaimer, the term of this patent is extended or adjusted under 35 U.S.C. 154(b) by 91 days.

(21) Appl. No.: 15/475,446

(22) Filed: Mar. 31, 2017

(65) Prior Publication Data

US 2018/0137458 A1  May 17, 2018

Related U.S. Application Data

(60) Provisional application No. 62/412,669, filed on Oct. 25, 2016.

(51) Int. Cl.
| | |
|---|---|
| *G06Q 10/08* | (2012.01) |
| *G06Q 30/04* | (2012.01) |
| *G06Q 20/10* | (2012.01) |
| *G08B 7/06* | (2006.01) |
| *G01C 21/34* | (2006.01) |
| *H04L 9/32* | (2006.01) |
| *G06Q 20/14* | (2012.01) |
| *G08G 1/0968* | (2006.01) |

(52) U.S. Cl.
CPC ......... *G06Q 10/087* (2013.01); *G01C 21/343* (2013.01); *G06Q 20/102* (2013.01); *G06Q 20/145* (2013.01); *G06Q 30/04* (2013.01); *G08B 7/06* (2013.01); *H04L 9/32* (2013.01); *G08G 1/096883* (2013.01)

(58) Field of Classification Search
CPC .... G06Q 10/087; G06Q 30/04; G06Q 20/102; H04L 9/32; G01C 21/343; G08B 7/06; G08G 1/096883
See application file for complete search history.

(56) References Cited

U.S. PATENT DOCUMENTS

| | | | | |
|---|---|---|---|---|
| 7,406,402 | B1 * | 7/2008 | Waitkus, Jr. | ........... G06Q 10/08 |
| | | | | 702/188 |
| 9,790,024 | B2 * | 10/2017 | Sundholm | ............. B07C 5/3412 |
| 2004/0046672 | A1 * | 3/2004 | Kasik | ................. G06K 17/0022 |
| | | | | 340/612 |
| 2004/0199401 | A1 * | 10/2004 | Wagner | ................... B07C 7/005 |
| | | | | 235/385 |
| 2010/0071572 | A1 * | 3/2010 | Carroll | ................... B30B 9/3007 |
| | | | | 100/229 A |

(Continued)

*Primary Examiner* — Nathan A Mitchell
(74) *Attorney, Agent, or Firm* — Buskop Law Group, P.C.; Wendy Buskop (57) ABSTRACT

A method for monitoring and tracking identified material in at least one fillable receptacle in at least one facility. The method includes installing at least one sensor with an ultrasonic transducer or a laser or both in one of the fillable receptacles, creating a customer profile with a fillable receptacle location, a quantity of fillable receptacles and a preset height limit for each fillable receptacle, and activating the sensor to repeatedly transmit an ultrasonic signal or light pulse into the receptacles and calculate remaining empty space then comparing remaining empty space to the preset height limits to determine whether the fillable receptacle is full. Fillable receptacle locations are aggregated into a route and a driver is alerted to download the route, enabling drivers to pick up filled fillable receptacles and remove identified material at the fillable receptacle locations using the route.

22 Claims, 7 Drawing Sheets

(56) References Cited

U.S. PATENT DOCUMENTS

| | | | |
|---|---|---|---|
| 2011/0093387 A1* | 4/2011 | Fuerstenberg | G06Q 20/102 705/40 |
| 2012/0105466 A1* | 5/2012 | Leslie | G09G 5/12 345/589 |
| 2012/0150436 A1* | 6/2012 | Rossano | G01C 21/3676 701/450 |
| 2012/0269346 A1* | 10/2012 | Best | H04L 63/0457 380/270 |
| 2012/0314059 A1* | 12/2012 | Hoffmann | G01F 23/292 348/135 |
| 2014/0214697 A1* | 7/2014 | McSweeney | B65F 1/004 705/308 |
| 2014/0278630 A1* | 9/2014 | Gates | G06Q 10/047 705/7.13 |
| 2015/0307273 A1* | 10/2015 | Lyman | G01G 19/08 705/7.13 |
| 2015/0323366 A1* | 11/2015 | Kekalainen | G01D 11/30 702/188 |
| 2015/0324760 A1* | 11/2015 | Borowski | B65F 1/0006 705/308 |
| 2016/0292862 A1* | 10/2016 | Mask | G06K 9/00201 |
| 2016/0300297 A1* | 10/2016 | Kekalainen | G06Q 10/08 |
| 2017/0052052 A1* | 2/2017 | Gwon | B65F 1/14 |
| 2017/0118609 A1* | 4/2017 | Rodoni | H04W 4/20 |
| 2017/0242420 A1* | 8/2017 | Mugnier | G05B 15/02 |
| 2017/0243269 A1* | 8/2017 | Rodini | G06Q 30/0611 |
| 2017/0366616 A1* | 12/2017 | Rodrigues Nascimento | H04L 67/34 |
| 2018/0158033 A1* | 6/2018 | Woods | G06Q 10/30 |

* cited by examiner

METHOD FOR MONITORING AND TRACKING IDENTIFIED MATERIAL IN FILLABLE RECEPTACLES

CROSS REFERENCE TO RELATED APPLICATIONS

The present application claims priority to and the benefit of US Provisional Patent Application Ser. No. 62/412,669 filed on Oct. 25, 2016, entitled "METHOD FOR MONITORING AND TRACKING IDENTIFIED MATERIAL IN FILLABLE RECEPTACLES". This reference is hereby incorporated in its entirety.

FIELD

The present embodiments generally relate to a method for monitoring and tracking identified material fillable receptacles in multiple locations.

BACKGROUND

A need exists for a method for controlling pick up, drop off, or refill of containers at multiple locations.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present embodiments relate to a method for monitoring and tracking identified material in fillable receptacles located in a facility or multiple facilities to efficiently schedule service calls.

The method for monitoring and tracking identified material in at least one fillable receptacle or container. Which can be in a single location, or in multiple locations, wherein the method can includes a series of steps, which are referenced below in no particular order, and are for examples purposes of how the method is used.

The method can include installing at least one sensor in at least one fillable receptacle. The at least one sensor can be made up of an ultrasonic transducer, a microprocessor with a microprocessor data storage in connection with a network. Multiple fillable receptacles can be located in one or more customer facilities or single or multiple fillable receptacles can be located in multiple facilities.

The method can include creating a customer profile in a client device connected to the network. The client device can have an administrative data storage connected to an administrative processor.

The customer profile can contain a customer name, a customer address, a customer location or customer locations, fillable receptacle locations, a quantity of fillable receptacles, and a preset height limit for each fillable receptacle.

The method can include activating the microprocessor to connect to the network.

The method can include actuating the at least one sensor to transmit an ultrasonic signal, receive a reflected signal, and use computer instructions in the microprocessor data storage to calculate an initial fillable receptacle height for at least one fillable receptacle using the reflected signal.

The method can include using the at least one sensor to repeatedly transmit ultrasonic signals into the at last one fillable receptacle as the fillable receptacle is filled with identified material, such as shred paper.

The method can include using computer instructions in the microprocessor data storage to calculate remaining empty space in the at least one fillable receptacle using the repeatedly transmitted ultrasonic signals and reflected signals by comparing the repeatedly reflected signals to the initial fillable receptacle height.

The method can include transmitting the calculated remaining empty space to a client device connected to the network.

The method can include using computer instructions in the administrative data storage to compare the calculated remaining empty space t the preset height limits for the at least one fillable receptacle to determine whether the fillable receptacle is full for pick up.

The method can include using computer instructions in the client device to aggregate fillable receptacle locations and compute a route of aggregated fillable receptacle locations for each fillable receptacle that is full for pick up.

The method can include using computer instructions to provide an alert to a driver client device connected to the network to download the computed route of the aggregated fillable receptacle locations.

The method can include downloading the route to the driver client device enabling a driver to pick up filled fillable receptacles and remove identified material at the fillable receptacle location.

The embodiments benefit both the environment, the customer and the third party service and/or client by saving fuel on unneeded trips that are avoided by more efficient scheduling of multiple pick ups, drop offs, or refills using dynamic routes.

The embodiments more effectively allow for control of operations and administrative costs by collecting data from a sensor that allows for real time decisions and develops a database that allows for predictive planning.

Based upon the ability to collect, store, and analyze data in the method, the customer experience is enhanced as a result of the system's ability to develop a customer use history. This allows for better and more economical service based on use.

Customers will benefit from knowing whether additional or less shredding containers are needed at their site. Also, the customers benefit by not having to wait for overflowing containers to be emptied or having half full containers picked up prematurely. The embodiments provide the customers with a better experience and confidence that they are getting what they pay for.

Driver routing managed by the method removes the need to schedule regular visits to customer locations and takes all guess work out of routing. The method's ability to process the data it receives from the device and/or sensor and create the most efficient routes for drivers to follow, saves on employee costs by only sending drivers where they are needed.

The embodiments allow for invoicing to be generated at the time of service based upon sensing the containers are full. As a result, the method can be used to make additions to the invoices. Multiple pick ups in any billing period can be added to customer's invoice as needed.

The term "administrative data storage" refers to the data storage connected to the administrative processor which is not at the customer site or with the driver, but is managed by the receptacle pick up company.

The term "authenticate and map communication" refers to using codes to verify each location of each sensor, each sensor to the customer profile, establishing sensors and customer profile relationships.

The term "customer" as used herein can be a customer of the service provider, which has at least one container at a location. In embodiments, the location can be any location with a longitude coordinate and a latitude coordinate. In embodiments, the location can have multiple containers. In embodiment the customer can have at least one container at multiple locations.

The term "customer profile" can refer to a customer name, such as Medidocs, customer address, 1200 Brickell Ave, a customer location such as the art studio located at the rear of the building at Brickell Avenue. The customer profile can have a quantity of fillable receptacles, such as 10, and a preset height limit for each fillable receptacle, such as 3 containers at 21 inches and 7 containers at 24 inches.

The term "data storage" as used herein refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

The term "financial information" refers to bank data, credit data, of the customer that is storable in the customer profile, along with billing information and dates of billing providing automatic billing upon completion of a route of a driver.

The term "identified material" refers to shredded paper, waste, liquids, and recycled materials such as cardboard, aluminum, and plastics.

The term "fillable receptacle" refers to a container such as a shred bin, trash can, a tank, or a dumpster. The refillable receptacle can hold from 50 pounds and up to 3 tons of identified material.

The term "facility" can refer to a customer defined location, such as 5 sites in a chemical plant, 10 sites in a high rise building.

The term "microprocessor" can refer to a processing chip on a board or a programmable logic circuit that process computer instructions stored in a connected data storage.

The term "network" can be a global communication network, such as cellular network, satellite network, the internet or combinations thereof.

The term "pick up" refers to a driver with truck moving onto a facility to empty a fillable receptacle.

The term "processor" can refer to a desktop, a laptop, a smart phone or a cellular phone, a tablet computer, a wearable computing device, a cloud processing system, or any known processor in the industry that is capable of processing, receiving and sending data.

The term "power supply" as used herein can refer to any known power supply, such as an onboard power supply such as batteries or a connection to a wall outlet.

The term "route" refers to a geographic route that a driver is to follow to perform pickup.

The term "sensor" as used herein can refer to a device that detects or measures a physical property and records data, indicates, or otherwise responds to the physical property. In embodiments, the sensor can be an ultrasonic transducer or a laser in embodiments, the sensor can be a plurality of sensors.

The term "sensor identifier" refers to a an alpha numeric sequence that is unique to each sensor.

The term "service provider" as used herein can be a secure shredding service, a waste collector, a bottling company, a recycling company, or any provider which picks up, drops off, or refills containers.

The term "signal" as used herein can refer to the output of the sensor. The signal can be converted to a human-readable display at the sensor location or transmitted electronically over a network for reading or further processing.

The term "ultrasonic transducer" refers to two transducers, one being a speaker and one being a microphone, producing a signal of 40 kilohertz, with a short burst of soundwaves, is sound out by the speaker transducer, the microphone receives the reflected signal, calculating distance using time.

Figure 1:
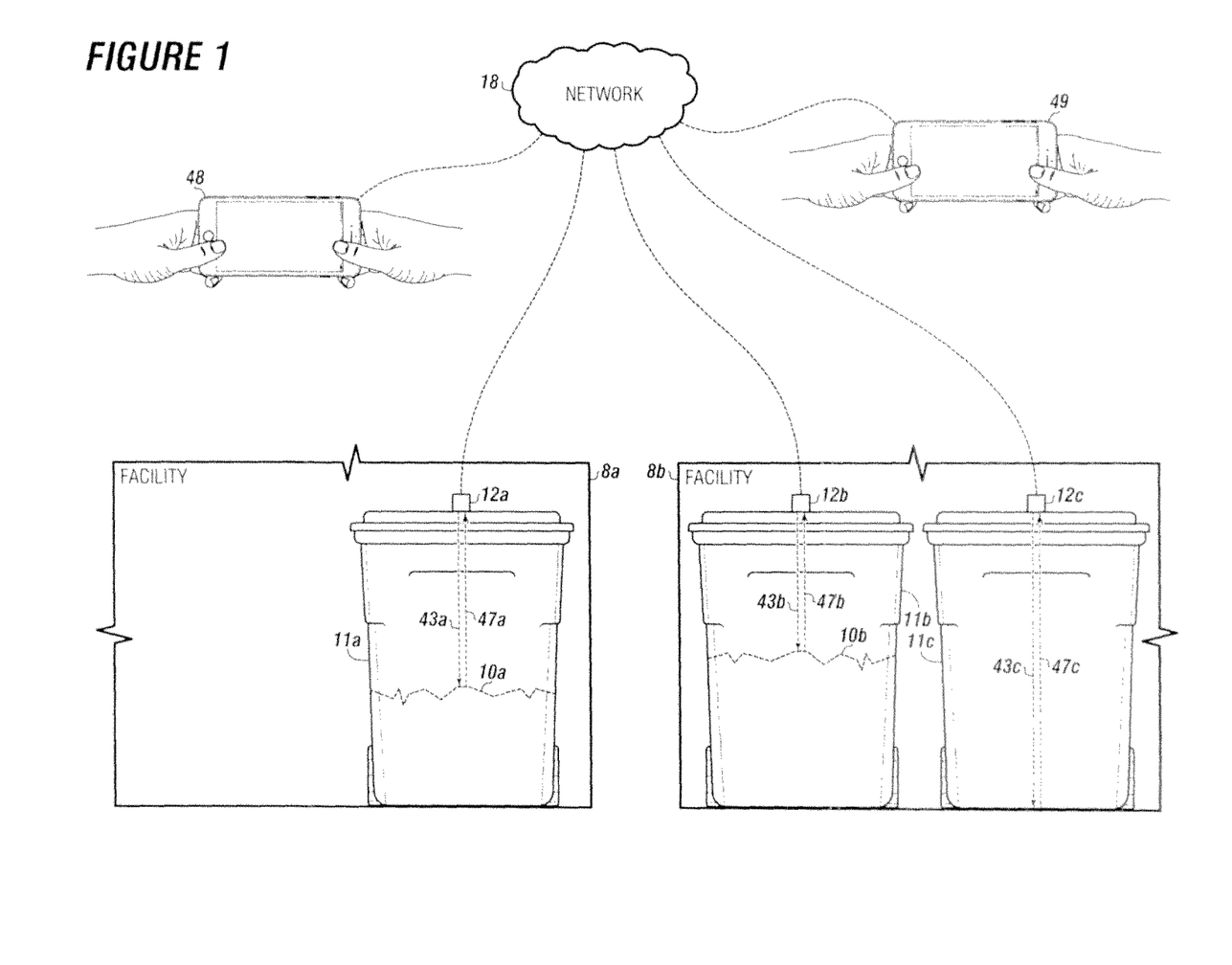
FIG. 1 depicts a system using the method according to one or more embodiments.

Turning now to the Figures, FIG. 1 depicts a system using the method according to one or more embodiments.

The system can include at least one sensor 12a-12c, which can be in communication with a client device 48.

In this embodiment, sensor 12a can be installed on at least one fillable receptacle 11a in at least one facility 8a. Sensors 12b and 12c can be installed on fillable receptacles 11b and 11c respectively in an additional facility 8b, which can be located at a different address from the initial facility.

The at least one sensor 12a-12c can transmit ultrasonic signals 43a-43c and receive reflected signals 47a-47c to calculate an initial fillable receptacle height for the fillable receptacles.

Fillable receptacles 11a and 11b are shown containing identified material 10a and 10b; whereas, fillable receptacle 11c does not have any identified material.

In embodiments, the identified material 10a and 10b can include at least one of: shredded paper, waste, liquids, and recycled materials.

In embodiments, the at least one sensor 12a-12c can be in communication with the client device 48 via a network 18. In embodiments, the client device can be in communication with a driver client device 49 via the network 18.

Figure 2A:
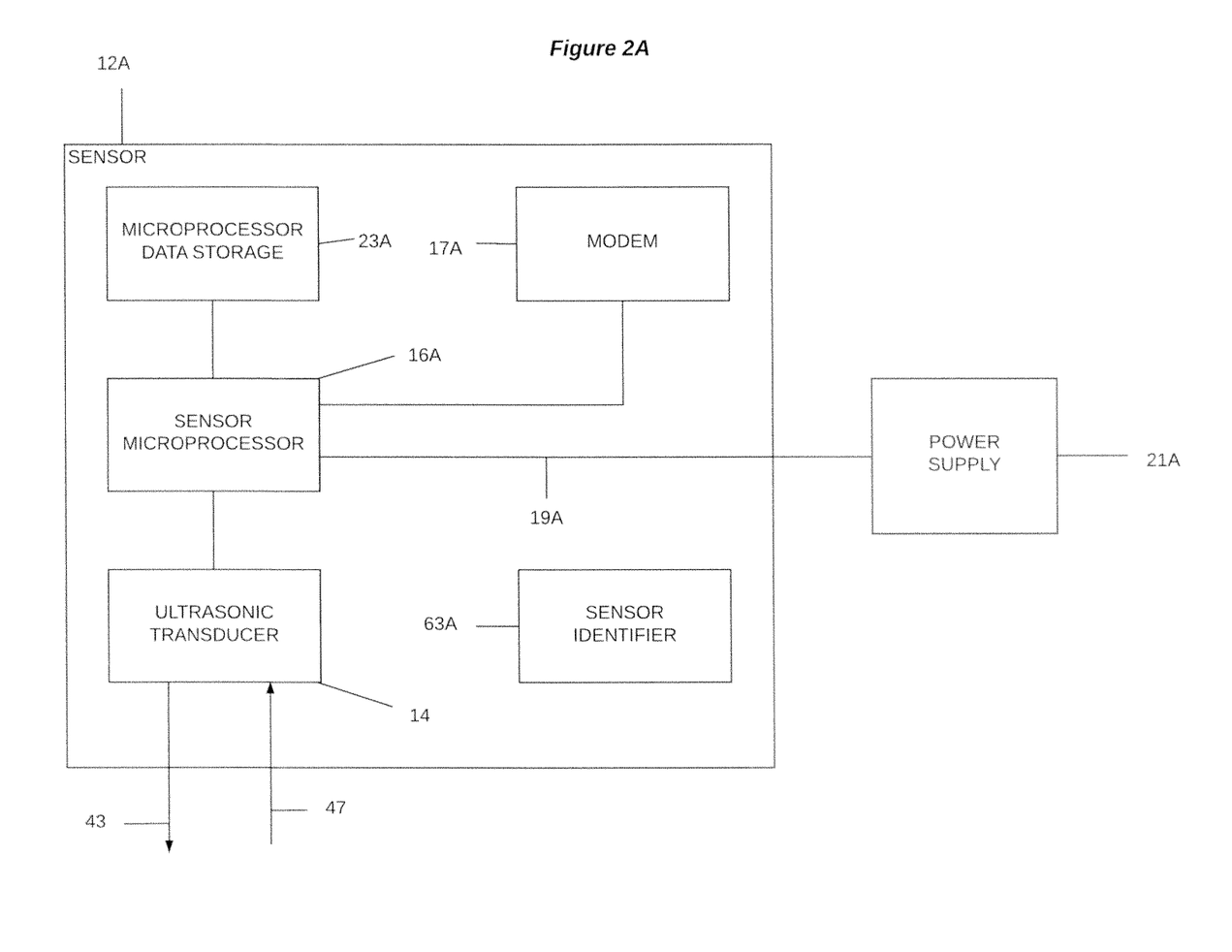
FIG. 2A depicts a sensor with an ultrasonic transducer usable with the method according to one or more embodiments.

FIG. 2A depicts a sensor with an ultrasonic transducer usable with the method according to one or more embodiments.

In embodiments, sensor 12A can have an ultrasonic transducer 14, a sensor microprocessor 16A with a microprocessor data storage 23A, which can be connected to the network, a modem 17A, and a connection 19A to a power supply 21A that is not on the unit.

Additionally, the at least one sensor can have a unique sensor identifier 63A for enabling the client device to authenticate communication from the at least one sensor to at least one customer profile.

In embodiments, the authenticated communication can be bidirectionally encrypted.

In embodiments the at least one sensor 12 can transmit the ultrasonic signals 43 and receive the reflected signals 47.

Figure 2B:
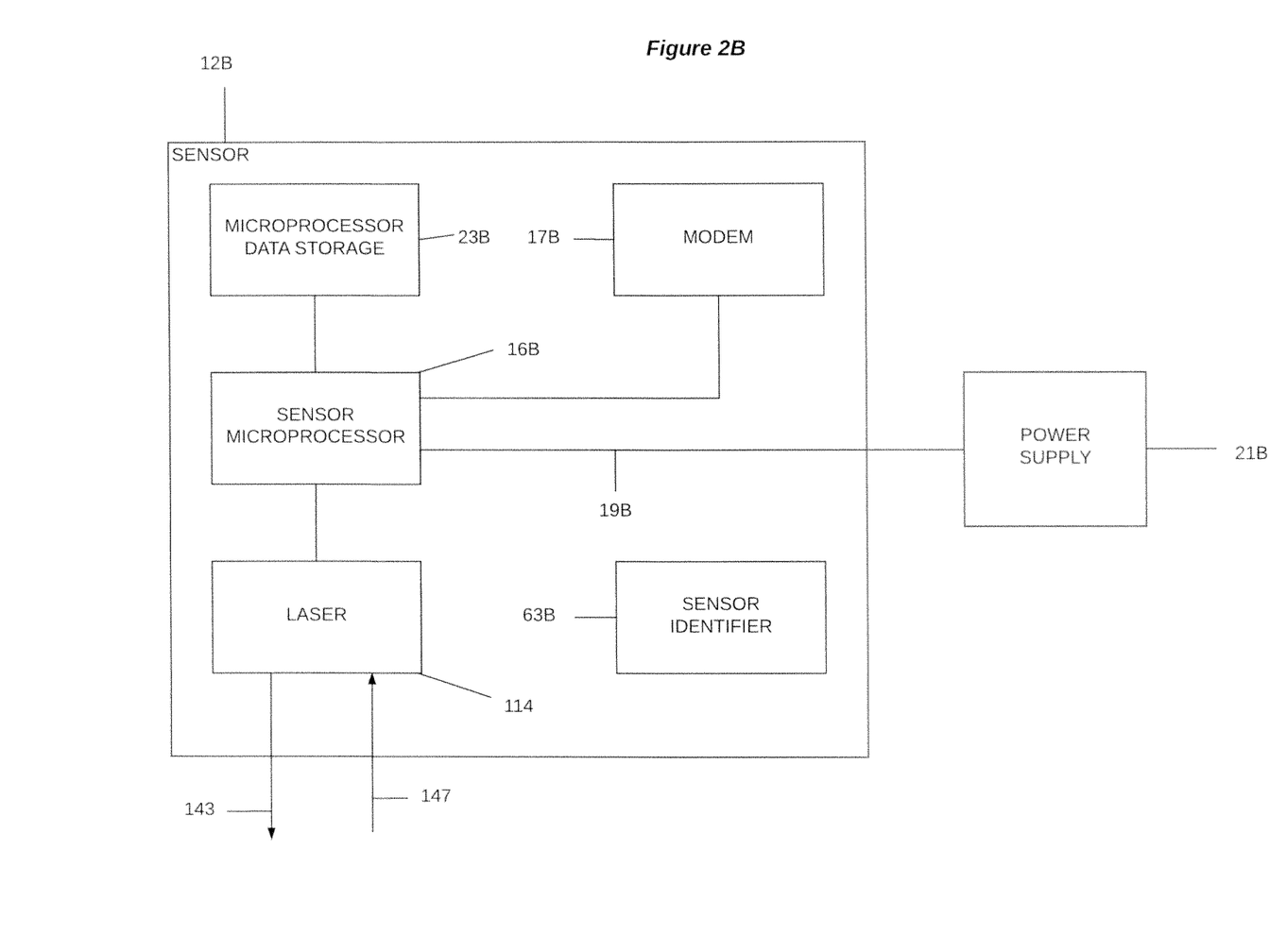
FIG. 2B depicts a sensor with a laser 114 usable with the method according to one or more embodiments.

FIG. 2B depicts a sensor with a laser 114 usable with the method according to one or more embodiments.

In embodiments, sensor 12B can have a laser 114, a sensor microprocessor 16B with a microprocessor data storage 23B, which can be connected to the network, a modem 17B, and a connection 19B to an onboard power supply 21B.

Additionally, the at least one sensor can have a unique sensor identifier 63B for enabling the client device to authenticate communication from the at least one sensor to at least one customer profile.

In embodiments the sensor 12B can transmit the light pulse 143 and receive the reflected pulse 147.

Figure 3:
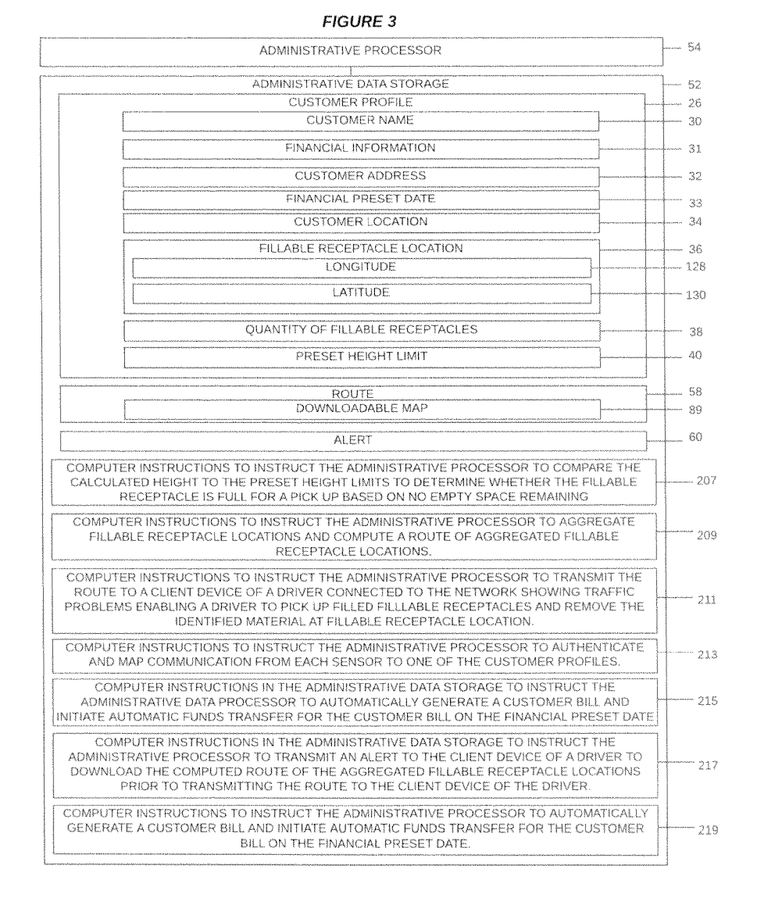
FIG. 3 depicts an administrative data storage usable with the method according to one or more embodiments.

FIG. 3 depicts an administrative data storage usable with the method according to one or more embodiments.

The administrative data storage 52 can be connected and in communication with an administrative processor 54.

In embodiments, the administrative data storage 52 can have at least one customer profile 26. In other embodiments, the administrative data storage can contain a plurality of customer profiles.

The customer profile 26 can contain a customer name 30, financial information 31, a customer address 32, a financial preset date 33, which can be used for payment, a customer location 34, a fillable receptacle location 36, a quantity of fillable receptacles 38, a preset height limit 40, a longitude 128 of the fillable receptacle location and a latitude 130 of the fillable receptacle location.

In embodiments, the customer location 34 can be at least one of: a residence of a customer, a business of the customer, or a location designated by the customer.

In embodiments, the administrative data storage 52 can contain a route 58 with a downloadable map 89 having fillable receptacle locations 36 identified on the downloadable map 89 and an alert 60.

The administrative data storage 52 can contain computer instructions 207 in the administrative data storage to instruct the administrative processor to compare the calculated height to the preset height limits to determine whether the fillable receptacle is full for a pick up based on no empty space remaining.

The administrative data storage 52 can contain computer instructions 209 in the administrative data storage to instruct the administrative processor to aggregate fillable receptacle locations and compute a route of aggregated fillable receptacle locations.

The administrative data storage 52 can contain computer instructions 211 in the administrative data storage to instruct the administrative processor to transmit the route to a client device of a driver connected to the network showing traffic problems enabling a driver to pick up filled fillable receptacles and remove the identified material at fillable receptacle location.

The administrative data storage 52 can contain computer instructions 213 to instruct the administrative processor to authenticate and map communication from each sensor to one of the customer profiles.

The administrative data storage 52 can contain computer instructions 215 computer instructions in the administrative data storage to instruct the administrative data processor to automatically generate a customer bill and initiate automatic funds transfer for the customer bill on the financial preset date.

The administrative data storage 52 can contain computer instructions 217 computer instructions in the administrative data storage to instruct the administrative processor to transmit an alert to the client device of a driver to download the computed route of the aggregated fillable receptacle locations prior to transmitting the route to the client device of the driver.

In embodiments, the driver client device can be connected to the network.

In embodiments, the alert 60 can be at least one of a text message, an audible alarm, an email, and a push notification.

The administrative data storage 52 can contain computer instructions 219 to instruct the administrative processor to automatically generate a customer bill and initiate automatic funds transfer for the customer bill on the financial preset date.

Figure 4:
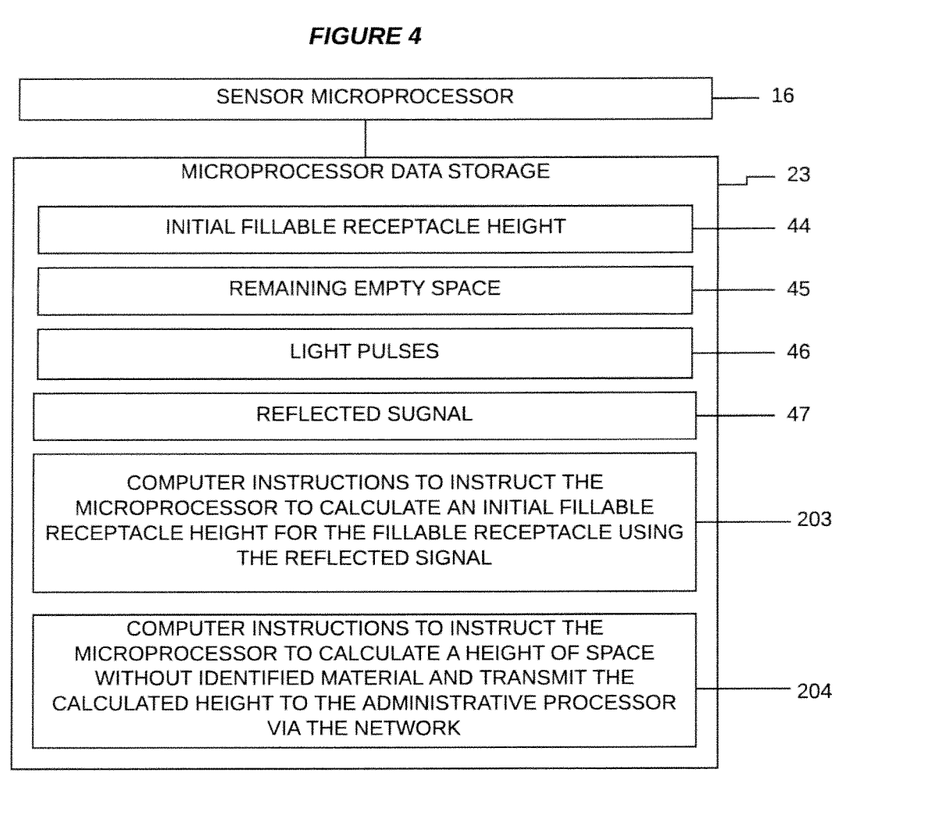
FIG. 4 depicts a microprocessor data storage usable with the according to one or more embodiments.

FIG. 4 is depicts a microprocessor data storage usable with the method according to one or more embodiments.

The microprocessor data storage 23 can be connected to or in communication with the sensor microprocessor 16.

In embodiments, the microprocessor data storage 23 can contain an initial fillable receptacle height 44 and remaining empty space 45, light pulses 46, and reflected signals 47.

The microprocessor data storage 23 can contain computer instructions 203 in the microprocessor data storage to instruct the microprocessor to calculate an initial fillable receptacle height for the fillable receptacle using the reflected signal.

In embodiments, the microprocessor data storage can have computer instructions 204 in to instruct the microprocessor to calculate a height of space without identified material and transmit the calculated height to the administrative processor via the network.

Figure 5A:
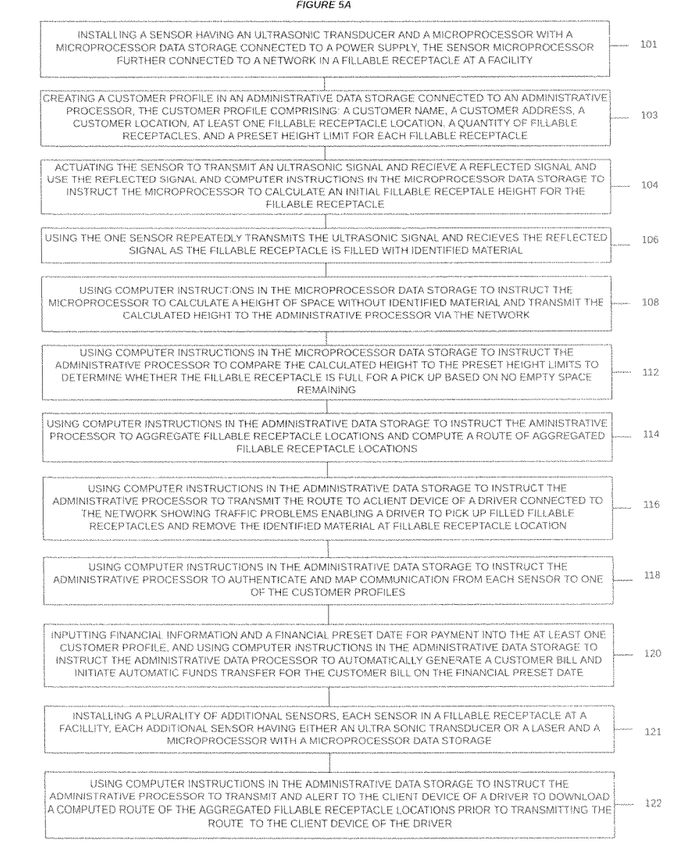
FIGS. 5A and 5B are two different exemplary methods according to one or more embodiments.
Figure 5B:
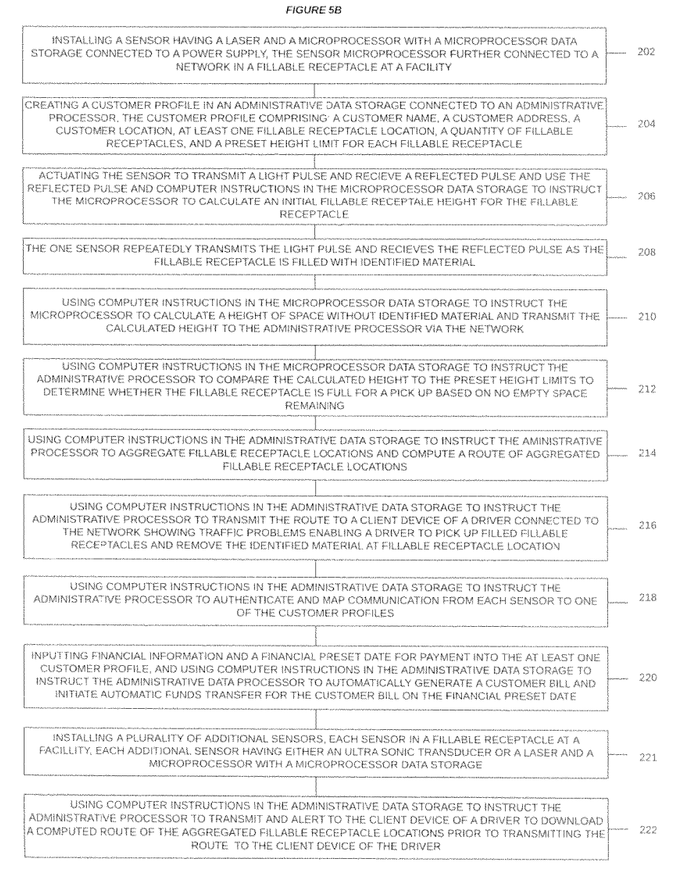

FIGS. 5A and 5B are two different exemplary methods according to embodiments.

The method for monitoring and tracking identified material in at least one fillable receptacle in at least one facility can include, but is not limited to the steps described below. The method can be utilized by a person of ordinary skill in the industry, and is not limited to a particular order or sequence.

In an embodiment, the method for monitoring and tracking identified material in at least one fillable receptacle in at least one facility, includes installing a sensor having an ultrasonic transducer and a microprocessor with a microprocessor data storage connected to a power supply, the sensor microprocessor further connected to a network in a fillable receptacle at a facility as indicated in box 101.

The method includes creating a customer profile in an administrative data storage connected to an administrative processor, the customer profile comprising: a customer name, a customer address, a customer location, at least one fillable receptacle location, a quantity of fillable receptacles, and a preset height limit for each fillable receptacle, as indicated in box 103.

The method includes actuating the sensor to transmit an ultrasonic signal and receive a reflected signal and use the reflected signal and computer instructions in the microprocessor data storage to instruct the microprocessor to calculate an initial fillable receptacle height for the fillable receptacle, as indicated in box 104.

The method includes using the one sensor to repeatedly transmit the ultrasonic signal and receive the reflected signal as the fillable receptacle is filled with identified material as indicated in box 106.

The method includes using computer instructions in the microprocessor data storage to instruct the microprocessor to calculate a height of space without identified material and transmit the calculated height to the administrative processor via the network as indicated in box 108.

The method includes using computer instructions in the administrative data storage to instruct the administrative processor to compare the calculated height to the preset height limits to determine whether the fillable receptacle is full for a pick up based on no empty space remaining as indicated in box 112.

The method includes using computer instructions in the administrative data storage to instruct the administrative processor to aggregate fillable receptacle locations and compute a route of aggregated fillable receptacle locations as indicated in box 114.

The method includes using computer instructions in the administrative data storage to instruct the administrative processor to transmit the route to a client device of a driver connected to the network showing traffic problems enabling a driver to pick up filled fillable receptacles and remove the identified material at fillable receptacle location as indicated in box 116.

The method includes using computer instructions in the administrative data storage to instruct the administrative processor to authenticate and map communication from each sensor to one of the customer profiles as indicated in box 118.

The method includes the step of inputting financial information and a financial preset date for payment into the at least one customer profile, and using computer instructions in the administrative data storage to instruct the administrative data processor to automatically generate a customer bill and initiate automatic funds transfer for the customer bill on the financial preset date as indicated in box 120.

The method includes the step of installing a plurality of additional sensors each sensor in a refillable receptacle at a facility, each additional sensor having either an ultrasonic transducer or a laser and a microprocessor with a microprocessor data storage connected to a network as indicated in box 121.

The method includes the step of using computer instructions in the administrative data storage to instruct the administrative processor to transmit an alert to the client device of a driver to download the computed route of the aggregated fillable receptacle locations prior to transmitting the route to the client device of the driver as indicated in box 122.

FIG. 5B depicts an embodiment method for monitoring and tracking identified material in at least one fillable receptacle in at least one facility.

The method includes installing a sensor having a laser and a microprocessor with a microprocessor data storage connected to a power supply, the sensor microprocessor further connected to a network in a fillable receptacle at a facility as indicated in box 202.

The method includes creating a customer profile in an administrative data storage connected to an administrative processor, the customer profile comprising: a customer name, a customer address, a customer location, at least one fillable receptacle location, a quantity of fillable receptacles, and a preset height limit for each fillable receptacle as indicated in box 204.

The method includes actuating the sensor to transmit a light pulse and receive a reflected pulse and use the reflected pulse and computer instructions in the microprocessor data storage to instruct the microprocessor to calculate an initial fillable receptacle height for the fillable receptacle as indicated in box 206.

The method includes using the sensor to repeatedly transmit the light pulse and receive the reflected pulse as the fillable receptacle is filled with identified material as indicated in box 208.

The method includes using computer instructions in the microprocessor data storage to instruct the microprocessor to calculate a height of space without identified material and transmit the calculated height to the administrative processor via the network as indicated in box 210.

The method includes using computer instructions in the administrative data storage to instruct the administrative processor to compare the calculated height to the preset height limits to determine whether the fillable receptacle is full for a pick up as indicated in box 212.

The method includes using computer instructions in the administrative data storage to instruct the administrative processor to aggregate Tillable receptacle locations as indicated in box 214.

The method includes using computer instructions in the administrative data storage to instruct the administrative processor to compute a route of aggregated fillable receptacle locations and transmit the route to a client device of a driver connected to the network enabling a driver to pick up filled fillable receptacles and remove the identified material at fillable receptacle location as indicated in box 216.

The method includes using computer instructions in the administrative data storage to instruct the administrative processor to authenticate and map communication from each sensor to one of the customer profiles as indicated in box 218.

The method includes the step of inputting financial information and a financial preset date for payment into the at least one customer profile using computer instructions in the administrative data storage to instruct the administrative data processor to automatically generate a customer bill and initiate automatic funds transfer for the customer bill on the financial preset date as indicated in box 220.

The method includes installing a plurality of additional sensors each sensor in a refillable receptacle at a facility, each additional sensor having either an ultrasonic transducer or a laser and a microprocessor with a microprocessor data storage connected to a network as indicated in box 221.

The method includes using computer instructions in the administrative data storage to instruct the administrative processor to transmit an alert to the client device of a driver to download the computed route of the aggregated fillable receptacle locations prior to transmitting the route to the client device of the driver as indicated in box 227.

Below are examples of how the system and method can be used.

Example 1

A customer, a multinational flow meter company called JoshFlow that manages flow meters has 9 locations and wants to monitor and track shredding in multiple locations simultaneously. In particular they want to monitor and track 5 fillable receptacles, such as shredding bins at 3 different customer locations.

Miami Monitoring owns an administrative processor located in a client device, connected to the network. Miami Monitoring has an administrative data storage with initially a terabyte of memory that stores executable instructions for implementation by the microprocessor including a user interface having 12 display pages.

The Miami Monitoring employee logs in and creates a customer profile for the flow meter company called Josh- Flow. The customer profiles contains the customer name JoshFlow, the longitude coordinate and latitude coordinate for each of the three different customer locations.

Additionally, each of the 5 bin locations is inputted into the customer profile using a longitude and a latitude from a GPS. The customer location can include an address of 1200 Brickel Avenue, Miami, Fla. 33131, and a quantity of shredding bins at each location is recorded. For JoshFlow, three shredding bins are co-located at each fillable receptacle location for this example.

In this example, 5 sensors are identified and each sensor's unique sensor identifier is inputted into the customer profile for JoshFlow.

Each sensor is installed on a shredding bin at a shredding bin location.

Each sensor has an ultrasonic transducer, such as Module HC-SR04 made by WYPH and a microprocessor such as and a microprocessor data storage with 32 kb of memory, and executable instructions, a modem, and a connection to a power supply, such as a plug to engage a power supply such as the wall plug of the facility with 110 volts.

Each sensor is then activated to create an encrypted bidirectional communication with the network.

In addition to the creation of the bidirectional communication, each sensor calculates an initial fillable receptacle height.

In this case, at a first location, 12 Wall Street, each sensor calculates an initial fillable receptacle height of 80 centimeters and transmits that calculation to the administrative processor via the network.

To perform this calculation, each sensor transmits an ultrasonic signal toward the bottom of the shred bin, and receives the reelected signal and uses a time calculation to determine the height of the shred bin without contents.

The microprocessor uses computer instructions in the microprocessor data storage to then repeatedly measure remaining empty space in each shred bin using a user preset unit of time, in this case, such as once every 24 hours for JoshFlow shred hinds.

The microprocessor transmits each empty height calculation to the administrative data storage over the network.

The administrative processor uses the received height of empty space information and compares the height of empty space information to preset height limits in the customer profile to identify when shredding bins are full for pick up. In this case, JoshFlow has preset height limits of 25 centimeters to indicate the shredding bin is full.

The administrative processor uses computer instructions in the administrative data storage to aggregate fillable receptacle locations of full shredding bins for each client. For JoshFlow, the aggregation occurs when each bin is listed as full. So, a first bin #145 becomes full first at a location on Main Street, and then a second bin #222 becomes full at a different location on Board Street, while simultaneously a third bin #345 back at the Main Street location is indicated as full.

The administrative processor uses the fillable receptacle locations of Main Street and Board Street to create a route on a map to provide most efficient directions for the driver to pick up the contents of the full shredding bins.

Miami Monitoring's driver receives an alert via his mobile device that a map is available for download to his mobile device that full shredding bins need pick up. The three full shredding bins, two on Main Street and one on Board Street are identified on a map for pick up.

The driver empties each bin on his/her route as shredding bins at all locations of the customer are continuously monitored.

Example 2

A customer, a local company called Samson Medical that operates a healthcare facility has one customer location and wants to monitor and track shredding in this location. In particular they want one shredding bin at the refillable receptacle location.

Miami Monitoring owns an administrative processor located in a client device, connected to a network. Miami Monitoring has an administrative data storage with initially 500 gigabytes of memory that stores executable instructions for implementation by the microprocessor.

The employee of Miami Monitoring logs in and creates a customer profile for the healthcare facility called Samson Medical.

The customer name Samson Medical, the longitude coordinate and latitude coordinate for the location are inputted into the customer profile. Additionally, the fillable receptacle location is inputted to the customer profile using a longitude and latitude from a GPS. The customer location can include an address of 555 Sunset Drive, Miami, Fla. 33133, and a quantity of shredding bins at the fillable receptacle location is recorded.

One sensor with a unique identification number is linked to the customer profile for Samson Medical with executable instructions in the administrative data storage that instructs the administrative processor to link the unique sensor identifier of the sensor to the customer profile.

The sensor is installed on the shredding bin at the fillable receptacle location.

The sensor has an ultrasonic transducer, such as Module HC-SR04 made by WYPH and a microprocessor, such as Arduino Nano and a microprocessor data storage with 32 kb of memory, executable instructions, a modem, such as SIM900 made by SainSmart and a connection such as a plug to engage a power supply, such as the wall plug of the facility with 110 volts.

The sensor is then activated to create a bidirectional communication with a network. For Samson Medical, the network is a cellular network that further communicates in an encrypted format to the network.

Usable networks can be global communication networks, local area networks, wide area networks, satellite networks, fiber optic networks, and combinations thereof.

In addition to the creation of the bidirectional communication, the sensor calculates an initial fillable receptacle height.

In this case, the customer location is 555 Sunset Drive, Miami, Fla. 33133. The sensor calculates an initial fillable receptacle height of 80 centimeters and transmits that calculation to the administrative processor via the network.

To perform this calculation, the sensor transmits an ultrasonic signal toward the bottom of the shred bin, and receives the reflected signal and uses a time calculation to determine the height of the shred bin without contents.

The microprocessor uses computer instructions in the microprocessor data storage to then repeatedly measure remaining empty space in each shred bin using a user preset unit of time, in this case, such as once every 20 hours for the shred bin.

The microprocessor transmits each empty height calculation to the administrative processor over the cellular network.

The administrative processor uses the received height of empty space and compares the height of empty space to preset height limits in the customer profile to identify when shredding bins are full for billing. In this case, Samson Medical has preset height limits of 30 centimeters to indicate the shredding bin is full.

The administrative processor uses a unique sensor identifier and computer instructions to identify Samson Medicals customer profile in the administrative data storage. For Samson Medical, the billing occurs when the bin is listed as full. The administrative processor uses computer instructions located on the administrative data storage to create an invoice. The updated bill is sent to the client via email. The client bill is automatically funded once a month on a financial preset date with financial information.

Example 3

A customer, a legal firm called Wendy's Law that manages a law firm has two locations and wants to monitor and track shredding in multiple locations simultaneously. In particular they want one shredding bin at each of two different locations.

Miami Monitoring owns an administrative processor located in a client device, connected to the network. Miami Monitoring has an administrative data storage with a 750 gigabytes of memory that stores executable instructions for implementation by the microprocessor.

An employee of Miami Monitoring logs in and creates a customer profile for the law firm called Wendy's Law.

The customer name Wendy's Law, the longitude coordinate, such as 29.7604° N and the latitude coordinate, such as 95.3698° W, are inputted into the customer profile for the first fillable receptacle location and the longitude coordinate 32.8406° N and the latitude coordinate 83.3408° W for the second fillable receptacle location. Additionally, each of the 2 bin locations is inputted into the customer profile using a longitude and latitude from a GPS. The client locations can include an address of 12345 West Broad Street, Houston, Tex. 77006 and 54321 North Hamilton Street, Houston, Tex. 77006. A quantity of shredding bins at each fillable receptacle location is recorded. For Wendy's Law. Two shredding bins are located at separate bin locations for this example.

Two sensors are identified and each sensor's unique sensor identifier is input to the customer profile for Wendy's Law. Each sensor is installed on a shredding bin at a shredding bin location.

Each sensor has an ultrasonic transducer, a microprocessor and the microprocessor data storage with 32 kb of memory and executable instructions, and a modem and a connection to engage a power supply, such as a wall plug of the facility with 110 volts.

Each sensor is then activated to create a bidirectional communication with a network. For Wendy's Law, the network is a local area network that further communicates in an encrypted format.

In addition to the creation of the encrypted bidirectional communication, the sensor calculates an initial fillable receptacle height.

In this case, at a first location, 12345 West Broad Street Houston, Tex. 77006, the sensor calculates an initial fillable receptacle height of 80 centimeters and transmits that calculation to the administrative processor via the network.

To perform this calculation, each sensor transmits an ultrasonic signal toward the bottom of the shred bin, and receives the reflected signal and uses a time calculation to determine the height of the shred bin without contents.

The microprocessor uses computer instructions in the microprocessor data storage to then repeatedly measure the height of empty space in each shred bin using a user preset unit of time, in this case, such as once every fifteen hours for two shred bins.

The microprocessor transmits each empty height calculation to the administrative processor over the local area network.

The administrative processor uses the received height of empty space information and compares the height of empty space information to preset height limits in the customer profile to identify when shredding bins are full for pick up. In this case, Wendy's Law has preset height limits of 24 cm to indicate the shredding bin is full.

The administrative processor uses computer instructions in the administrative data storage to aggregate locations of full shredding bins for each client. For Wendy's Law, the aggregation occurs when each bin is listed as full. So, a first bin #447 becomes full first at the location on 12345 West Broad Street, Houston, Tex. 77006. Then, a second bin #325 becomes full at a different location on 54321 North Hamilton Street, Houston, Tex. 77006.

The administrative processor uses the aggregated geographic locations of Broad Street and Hamilton Street and creates a route on a map to provide most efficient directions for driver pick up of the contents of the full shredding bins.

Miami Monitoring's driver receives an alert via his mobile device that a map is available for download to his mobile device that full shredding bins need pick up. The two full shredding bins, one on Broad Street and one on Hamilton Street are identified on a map for pick up.

The driver empties each bin on his/her route as shredding bins at all locations of the client are continuously monitored. On the next sensor reading, an empty status is sent to the administrative processor over an encrypted network into the customer profile.

Example 4

A customer, a multinational company called Thorough Good that manages race horses has one location and wants to monitor and track shredding in this location. In particular they want one shredding bin at the location.

Miami Monitoring owns an administrative processor located in a client device, connected to the network. Miami Monitoring has an administrative data storage with a terabyte of memory that stores executable instructions for implementation by the microprocessor including a user interface having fifteen display pages.

The user interface allows an employee of Miami Monitoring to login and create a customer profile for the horse racing company called Thorough Good.

The customer name Thorough Good, the longitude coordinate and latitude coordinate for the one location is inputted into the customer profile. Additionally, the one bin location is inputted into the customer profile using a longitude and latitude from a GPS. The customer location can include an address of 575 North Harvard Avenue, Boston, Mass. and a quantity of shredding bins at each fillable receptacle location is recorded. For Thorough Good, one shredding bin is at the fillable receptacle location for this example.

One sensor is identified and the sensor's unique sensor identifier is input to the customer profile for Thorough Good.

Each sensor is installed on a shredding bin at a shredding bin location.

Each sensor has an ultrasonic transducer, a microprocessor, a microprocessor data storage with 32 kb of memory, executable instructions, a modem, and a connection such as a plug to engage a power supply such as the wall plug of the facility with 110 volts.

Each sensor is then activated to create a bidirectional communication with a network.

For Thorough Good, the network is a local area network that farther communicates in an encrypted format.

In addition to the creation of the bidirectional communication, the sensor calculates and initial fillable receptacle height.

In this case, at the location, Harvard Avenue, the sensor calculates an initial fillable receptacle height of 80 centimeters and transmits that calculation to the administrative processor via the network. The information is sent via a URL string including an encryption key containing the unique sensor identifier of the sensor to Thorough Good's customer profile. The administrative processor receives the URL string and authenticates the encryption key inputting the calculations to Thorough Good's customer profile.

To perform this calculation, the sensor transmits an ultrasonic signal toward the bottom of the shred bin, and receives the reflected signal and uses a time calculation to determine the height of empty space for the shred bin without contents.

The microprocessor uses computer instructions in the microprocessor data storage to then repeatedly measure remaining empty space in each shred bin using a user preset unit of time, in this case, such as once every 24 hours for the shred bin.

The microprocessor transmits each empty height calculation to the administrative processor via the LAN and internet. The information is sent via a URL string including an encryption key containing the unique sensor identifier tying the sensor to Thorough Good's customer profile. The administrative processor receives the URL string and authenticates the encryption key inputting the calculations to Thorough Good's customer profile.

The administrative processor uses the received height of empty space information and compares the height of empty space information to preset height limits in the customer profile to identify when shredding bins are full for pick up. In this case, the bin has preset height limits of 25 centimeters to indicate the shredding bin is full.

The administrative processor uses computer instructions in the administrative data storage to aggregate fillable receptacle locations of full shredding bin for the customer. For Thorough Good, the aggregation occurs when the bin is listed as full.

The administrative processor uses the aggregated geographic location and creates a route on a map to provide most efficient directions for driver pick up of the contents of the full shredding bins.

Miami Monitoring's driver receives an alert via his mobile device that a map is available for download to his mobile device of full shredding bin for pick up. The full shredding bin is identified on a map for pick up.

The driver empties the bin as the shredding bin at this location of the client is continuously monitored.

Example 5

A customer, an international company called Tony's Shipping that manages container shipping has 3 locations and wants to monitor and track shredding in multiple locations simultaneously. In particular they want one shredding bin at each of three different customer locations.

Miami Monitoring owns an administrative processor located in a computing cloud, connected to the Internet. Miami Monitoring has an administrative data storage with two terabytes of memory that stores executable instructions for implementation by the administrative processor including an user interface having 20 display pages.

The user interface allows an employee of Miami Monitoring to login and create a customer profile for the international company called Tony's Shipping.

The customer name, Tony's Shipping, the longitude coordinate and latitude coordinate for each of the three different locations are inputted into the customer profile. Additionally, each of the three bin locations is inputted into the customer profile using a longitude and latitude from a GPS. The customer location can include an address of 444 Main Street, New York, N.Y. 10020 and a quantity of shredding bins at each customer location is recorded.

Three sensors are identified and each sensor's unique sensor identifier is input to the customer profile for Tony's Shipping.

Each sensor is installed on a shredding bin at a fillable receptacle location.

Each sensor has an ultrasonic transducer and a microprocessor, a microprocessor data storage with 32 kb of memory and executable instructions, a modem, a power supply, such as an on-board power supply using computer instructions in the microprocessor data storage to instruct the microprocessor to monitor power supply life expectation against preset limits input into the customer profile.

Each sensor is then activated to create a bidirectional communication with a network. For Tony's Shipping, the network is a local area network that further communicates in an encrypted format.

In this case, at a first location, 444 Main Street, New York, N.Y. 10020, each sensor calculates an initial battery life of 10 indicating a full onboard power supply and transmits that calculation using the administrative processor to the customer profile via the network.

To perform this calculation, a formula is used to calculate remaining battery and expressed as a digit from 1-10. 1 is empty and 10 is full.

The microprocessor uses computer instructions in the microprocessor data storage to then repeatedly measure remaining onboard power supply in each shred bin using a user preset unit of time, in this case, such as once every 24 hours for three shred bins.

The microprocessor transmits each onboard power supply calculation to the administrative processor over the LAN.

The administrative processor uses the received onboard power supply calculation information and compares the information to preset power limits in the customer profile to identify when shredding bins are low on power and ready for servicing. In this case, Tony's Shipping has preset power limits of "2" to indicate the shredding bin is low on power.

The administrative processor uses computer instructions in the administrative data storage to aggregate geographic locations of low power shredding bins for each client. For Tony's Shipping, the aggregation occurs when each bin is listed as low power. So, a first bin #724 becomes low power first at the location on Main Street, and then a second bin #527 becomes low power at a different location on 16th West 16th, while simultaneously the third bin at the Uptown Drive location is indicated as low power.

The administrative processor uses the aggregated geographic locations of Main Street, West 16th Street, and Uptown Drive and creates a route on a map to provide most efficient directions for driver servicing of the sensors' onboard power supply.

Miami Monitoring's driver receives an alert via his mobile device that a map is available for download to his mobile device that the low powered sensors need onboard power supply replacement. The 3 low powered sensors, one on Main Street one on West 16th Street and one on Uptown Drive are identified on a map for pick up.

The driver Changes the onboard power supply for each sensor on his/her route as shredding bins onboard power supply at all locations of the client are continuously monitored.

Example 6

A customer, a large company called Marketing Masters that manages a marketing firm has one location and wants to monitor and track multiple shredding bins in the fillable receptacle location simultaneously. In particular they want five shredding bins positioned throughout the facility.

Miami Monitoring owns an administrative processor located in a computing cloud, connected to the internet. Miami Monitoring has an administrative data storage with initially 750 gigabytes of memory that stores executable instructions for implementation by the administrative processor including a user interface having 15 display pages.

The employee of Miami Monitoring to logs in and creates a customer profile for the large company called Marketing Masters.

Marketing Masters' longitude coordinate and latitude coordinate for the one fillable receptacle location are inputted into the customer profile. Additionally, each of the five fillable receptacle locations is inputted into the customer profile using a longitude and latitude from a GPS. The customer location can include an address of 7000 Sunset Drive, Miami, Fla. 33013. A quantity of shredding bins at each bin location is put into the customer profile. Five shredding bins are co-located at the customer location for this example. Each of the shredding bin's fillable receptacle locations within the facility is entered into the customer profile.

Five sensors are identified and each sensor's unique sensor identifier is input to the customer profile for Marketing Masters.

Each sensor is installed on a shredding bin at a fillable receptacle location.

Each sensor has an ultrasonic transducer, a microprocessor, a microprocessor data storage with 32 kb of memory and executable instructions, a modem, and a connection such as a plug to engage a power supply such as the wall plug of the facility with 110 volts.

Each sensor is then activated to create a bidirectional communication with a network. For Marketing Masters. The network is a local area network that further communicates in an encrypted format.

In addition to the creation of the bidirectional communication, the sensor calculates and initial fillable receptacle height.

In this case, at the customer location, 7000 Sunset Drive, each sensor calculates an initial fillable receptacle height of 80 centimeters and transmits that calculation to the administrative processor via the network.

To perform this calculation, each sensor transmits an ultrasonic signal toward the bottom of the shred bin, and receives the reflected signal and uses a time calculation to determine the initial fillable receptacle height of the shred bin without contents.

The microprocessor uses computer instructions in the microprocessor data storage to then repeatedly measure the height of empty space in each shred bin using a user preset unit of time, in this case, such as once every 18 hours for 5 shred bins.

The microprocessor transmits each remaining empty space calculation to the administrative processor over the LAN.

The administrative processor uses the received height of empty space information and compares the height of empty space information to the initial fillable receptacle height in the customer profile to identify when shredding bins are full for pick up. In this case, Marketing Masters has preset height limits of 25 centimeters to indicate the shredding bin is full.

The administrative processor uses computer instructions in the administrative data storage to aggregate geographic locations of full shredding bins for each client. For Marketing Masters, the aggregation occurs when each bin is listed as full. So, a first bin #495 becomes full first at the 7000 Sunset Drive location, and then a second bin #364 becomes full, while simultaneously a third bin #158 is indicated as full.

The administrative processor uses the customer location of 7000 Sunset Drive and creates a map to provide most efficient directions for driver pick up of the contents of the full shredding bins.

Miami Monitoring's driver receives an alert via his mobile device that a map is available for download to his mobile device that full shredding bins need pick up. The three full shredding bins are identified on a facility map of 7000 Sunset Drive for pick up.

The driver empties each bin at the 7000 Sunset Drive location as shredding bins at this location of the client are continuously monitored.

Example 7

A customer, a local company called Dixie Sticks that manages Popsicle production has seven locations and wants to monitor and track shredding in multiple locations simultaneously. In particular they want one shredding bin at each of seven different customer locations.

Miami Monitoring owns an administrative processor located in a computing cloud, connected to the network. Miami Monitoring has an administrative data storage with initially 500 gigabytes of memory that stores executable instructions for implementation by the administrative processor.

The employee of Miami Monitoring logs in and creates a customer profile for the local company called Dixie Sticks.

The customer name Dixie Sticks, the customer locations for each of the seven different locations, and an email is input to the customer profile. Additionally, each of the refillable receptacle locations is input to the customer profile using a longitude and latitude from a GPS. The customer location can include an address of 4545 South Broad Street, Miami, Fla. 33157, and a quantity of shredding bins at each refillable receptacle location is recorded. For Dixie Sticks, one shredding bin is located at each refillable receptacle location for this example.

Seven sensors are identified and each sensor's unique sensor identifier is input to the customer profile for Dixie Sticks.

Each sensor is installed on a shredding bin at a refillable receptacle location.

Each sensor has an ultrasonic transducer and a microprocessor and a microprocessor data storage with 32 kb of memory, executable instructions, a modem, and a connection such as a plug to engage a power supply such as the wall plug of the facility with 110 volts Each sensor is then activated to create a bidirectional communication over a network. For Dixie Sticks, the network is a local area network that further communicates in an encrypted format.

In addition to the creation of the bidirectional communication, the sensor calculates and initial fillable receptacle height.

In this case, at a first location, Broad Street, the sensor calculates an initial fillable receptacle height of 80 centimeters and transmits that calculation to the administrative data storage via the network.

To perform this calculation, each sensor transmits an ultrasonic signal toward the bottom of the shred bin, and receives the reflected signal and uses a time calculation to determine the initial fillable receptacle height of the shred bin without contents.

The microprocessor uses computer instructions in the microprocessor data storage to then repeatedly measure remaining the height of empty space in each shred bin using a user preset unit of time, in this case, such as once every 20 hours for seven shred binds.

The microprocessor transmits each empty height calculation to the administrative processor over the LAN.

The administrative processor uses the height of empty space and compares the height of empty space information to the initial fillable receptacle height in the customer profile to identify when shredding bins are at 50 percent of capacity. In this case, Dixie Sticks has an initial fillable receptacle height of 50 centimeters to indicate the shredding bin is at 50 percent of capacity.

The administrative processor uses computer instructions in the administrative data storage to create a notification email which is sent to the client Dixie Sticks and an administrator at Miami Monitoring that shredding bins are at 50 percent capacity. For Dixie Sticks the creation occurs when each bin is listed as 50 percent of capacity. So, a first bin #491 becomes 50 percent of capacity first at the location on Broad Street and then a second bin #627 becomes 50 percent of capacity at a different location on Mary Street, while simultaneously a third bin at the Johnson Street location is indicated as 50 percent of capacity.

The administrative processor uses the email listed in the customer profile of Dixie Sticks to send a notification email indicating that the three locations one on Broad Street one on Mary Street and one on Johnson Street are at 50 percent of capacity.

Miami Monitoring receives an email alert that the client Dixie Sticks 3 locations one on Broad Street, one on Mary Street, and one on Johnson Street are at 50 percent of capacity.

In embodiments, the location is at least one of: a residence of a customer, a business of the customer, or a location designated by the customer.

In embodiments the sensor comprises a modem and a connection to a power supply.

In embodiments the sensor has at least one unique sensor identifier, such as a serial number, or other code in enabling the administrative processor in the client device to authenticate communication from the sensor to at least one customer profile.

In embodiments, the authenticated communication is bi-directionally encrypted.

In embodiments, the power supply can be an onboard power supply, such as a battery pack.

In embodiments, the route can include a downloadable map with fillable receptacle locations identified on the downloadable map. The map can be interactive, movable and can utilize GPS located positioned on the receptacles.

In embodiments, the method can include inputting financial information, such as banking information or credit card information, and a financial preset date such as the first of every month, for payment into the customer profile. With these added elements, the client device can use computer instructions in the client device to automatically generate a customer bill and initiate automatic funds transfer for the customer bill on the financial preset date.

In embodiments, the identified material includes at least one of shredded paper, waste, liquids, and recycled materials.

In embodiments the fillable receptacle location can include both a longitude coordinate and a latitude coordinate.

In embodiments, the alert can be at least one of: a text message, an audible alarm, an email, and a push notification.

While these embodiments have been described with emphasis on the embodiments, it should be understood that within the scope of the appended claims, the embodiments might be practiced other than as specifically described herein.

What is claimed is:

1. A method for monitoring and tracking remaining empty space in at least one fillable receptacle in at least one facility, the method comprising:
   a. installing a sensor consisting of: an ultrasonic transducer and a microprocessor with a microprocessor data storage connected to a power supply in a fillable receptacle at a facility, the microprocessor of the sensor further connected to a network;
   b. creating a customer profile in an administrative data storage connected to an administrative processor connected to the network, the customer profile consisting of: a customer name, a customer address, a customer location at a facility, at least one fillable receptacle location at the facility, a quantity of fillable receptacles, and a preset height limit for each fillable receptacle to determine remaining empty space;
   c. actuating the sensor having the ultrasonic transducer to transmit an ultrasonic signal and receive a reflected signal and use the reflected signal and computer instructions in the microprocessor data storage to instruct the sensor microprocessor to calculate an initial fillable receptacle height for the fillable receptacle and determine remaining empty space;
   d. using the sensor to repeatedly transmit ultrasonic signals and receive reflected signals as the fillable receptacle is filled with identified material;
   e. using computer instructions in the microprocessor data storage to instruct the sensor microprocessor to calculate a height of space of the fillable receptacle without identified material as remaining empty space using the reflected signals, and transmit the remaining empty space to the administrative processor via the network;
   f. using computer instructions in the administrative data storage to instruct the administrative processor to compare the calculated remaining empty space to the preset height limits to determine whether the fillable receptacle is ready for a pick up based on remaining empty space;
   g. using computer instructions in the administrative data storage to instruct the administrative processor to aggregate fillable receptacle locations at the facility and compute a route of aggregated fillable receptacle locations at the facility; and h. using computer instructions in the administrative data storage to instruct the administrative processor to transmit the route to a client device of a driver connected to the network showing traffic problems enabling a driver to pick up ready fillable receptacles and remove the identified material at fillable receptacle locations.

2. The method of claim 1, wherein the sensor comprises a modem, a real time clock, and a connection to a power supply.

3. The method of claim 1, wherein the sensor comprises a unique sensor identifier, and using computer instructions in the administrative data storage to instruct the administrative processor to authenticate and map communication from each sensor to one of the customer profiles.

4. The method of claim 3, wherein the authenticated and mapped communication is bidirectionally encrypted.

5. The method of claim 1, wherein the route comprises a downloadable map with the fillable receptacle locations identified on the downloadable map.

6. The method of claim 1, comprising the step of inputting financial information and a financial preset date for payment into the at least one customer profile, and using computer instructions in the administrative data storage to instruct the administrative data processor to automatically generate a customer bill and initiate automatic funds transfer for the customer bill on the financial preset date.

7. The method of claim 1, wherein the identified material includes at least one of: shredded paper, waste, and liquids.

8. The method of claim 1, wherein the at least one fillable receptacle location comprises a longitude coordinate and a latitude coordinate.

9. The method of claim 1, comprising installing a plurality of additional sensors each sensor in a refillable receptacle at a facility, each additional sensor having either an ultrasonic transducer or a laser and a microprocessor with a microprocessor data storage connected to a network.

10. The method of claim 1 comprising using computer instructions in the administrative data storage to instruct the administrative processor to transmit an alert to the client device of a driver to download the computed route of the aggregated fillable receptacle locations prior to transmitting the route to the client device of the driver.

11. The method of claim 10, wherein the alert is at least one of: a text message, an audible alarm, an email, and a push notification.

12. A method for monitoring and tracking remaining empty space in at least one fillable receptacle in at least one facility, the method comprising:

a. installing a sensor consisting of: a laser and a microprocessor with a microprocessor data storage connected to a power supply in a fillable receptacle at a facility, the microprocessor of the sensor further connected to a network;

b. creating a customer profile in an administrative data storage connected to an administrative processor connected to the network, the customer profile consisting of: a customer name, a customer address, a customer location at a facility, at least one fillable receptacle location at the facility, a quantity of fillable receptacles, and a preset height limit for each fillable receptacle to determine remaining empty space;

c. actuating the sensor having a laser to transmit an light pulse and receive a reflected pulse and use the reflected pulse and computer instructions in the microprocessor data storage to instruct the sensor microprocessor to calculate an initial fillable receptacle height for the fillable receptacle and determine remaining empty space;

d. using the sensor to repeatedly transmit the light pulse and receive reflected pulses as the fillable receptacle is filled with identified material;

e. using computer instructions in the microprocessor data storage to instruct the sensor microprocessor to calculate a height of space of the fillable receptacle without identified material as remaining empty space using the reflected signals and transmit the remaining empty space to the administrative processor via the network;

f. using computer instructions in the administrative data storage to instruct the administrative processor to compare the calculated remaining empty space to the preset height limits to determine whether the fillable receptacle is ready for a pick up based on remaining empty space;

g. using computer instructions in the administrative data storage to instruct the administrative processor to aggregate fillable receptacle locations at the facility and compute a route of aggregated fillable receptacle locations at the facility;

h. using computer instructions in the administrative data storage to instruct the administrative processor transmit the route to a client device of a driver connected to the network showing traffic problems enabling a driver to pick up ready fillable receptacles and remove the identified material at fillable receptacle locations.

13. The method of claim 12, wherein the sensor comprises a modem, a real time clock, and a connection to a power supply.

14. The method of claim 12, wherein the sensor comprises a unique sensor identifier, which enables the administrative processor to use computer instructions in the administrative data storage to instruct the administrative processor to authenticate and map communication from each sensor to one of the customer profiles.

15. The method of claim 14, wherein the authenticated and mapped communication is bidirectionally encrypted.

16. The method of claim 12, wherein the route comprises a downloadable map with the fillable receptacle locations identified on the downloadable map.

17. The method of claim 12, comprising the step of inputting financial information and a financial preset date for payment into the at least one customer profile using computer instructions in the administrative data storage to instruct the administrative data processor to automatically generate a customer bill and initiate automatic funds transfer for the customer bill on the financial preset date.

18. The method of claim 12, wherein the identified material includes at least one of: shredded paper, and waste, liquids.

19. The method of claim 12, wherein the at least one fillable receptacle location comprises a longitude coordinate and a latitude coordinate.

20. The method of claim 12, comprising installing a plurality of additional sensors each sensor in a refillable receptacle at a facility, each additional sensor having either an ultrasonic transducer or a laser and a microprocessor with a microprocessor data storage connected to a network.

21. The method of claim 12, comprising using computer instructions in the administrative data storage to instruct the administrative processor to transmit an alert to the client device of a driver to download the computed route of the aggregated fillable receptacle locations prior to transmitting the route to the client device of the driver.

22. The method of claim 21, wherein the alert is at least one of: a text message, an audible alarm, an email, and a push notification.

\* \* \* \* \*